United States Patent [19]

Huang

[11] Patent Number: 5,435,237
[45] Date of Patent: Jul. 25, 1995

[54] MULTIPURPOSE FOOD PROCESSOR

[76] Inventor: Andrew W. H. Huang, 7F, No. 51, Sec. 1, Min Sheng E. Road, Taipei, Taiwan

[21] Appl. No.: 383,389

[22] Filed: Feb. 3, 1995

[51] Int. Cl.⁶ .......................... A23N 1/02; A47J 43/06
[52] U.S. Cl. ...................... 99/492; 99/510; 241/37.5; 241/92; 241/273.3; 241/282.1
[58] Field of Search .......................... 99/492, 509–513, 99/484, 486; 241/37.5, 79, 92, 101.1, 101.2, 273.1–273.4, 282.1, 282.2; 366/314, 601

[56] References Cited

U.S. PATENT DOCUMENTS

| | | | |
|---|---|---|---|
| 4,173,310 | 11/1979 | Schaeffer | 241/282.1 |
| 4,199,112 | 4/1980 | McLean | 241/273.2 |
| 4,516,733 | 5/1985 | Funagura et al. | 241/79 |
| 5,222,430 | 6/1993 | Wang | 241/37.5 |
| 5,257,575 | 11/1993 | Harrison et al. | 99/511 |
| 5,289,763 | 3/1994 | Le Rouzic et al. | 366/314 |
| 5,355,784 | 10/1994 | Franklin et al. | 99/492 |
| 5,379,953 | 1/1995 | Rebordosa et al. | 241/101.2 |
| 5,392,699 | 2/1995 | Tai | 99/492 |

Primary Examiner—Timothy F. Simone
Attorney, Agent, or Firm—Buckman and Archer

[57] ABSTRACT

A multipurpose food processor including a power unit, a transmission mechanism mounted inside the power unit and connected to the power unit by a press button, an arched swivel arm pivotably connected to the power unit and controlled to release the press button for operation, a hollow shell coupled to the bottom cover of the power unit and defining with a movable pressure plate a work chamber, a rotary cylinder suspended inside the hollow shell and rotated by the transmission mechanism to move cutting tools through vegetables, fruits, etc., in the work chamber when the pressure plate is moved toward the rotary cylinder.

16 Claims, 7 Drawing Sheets

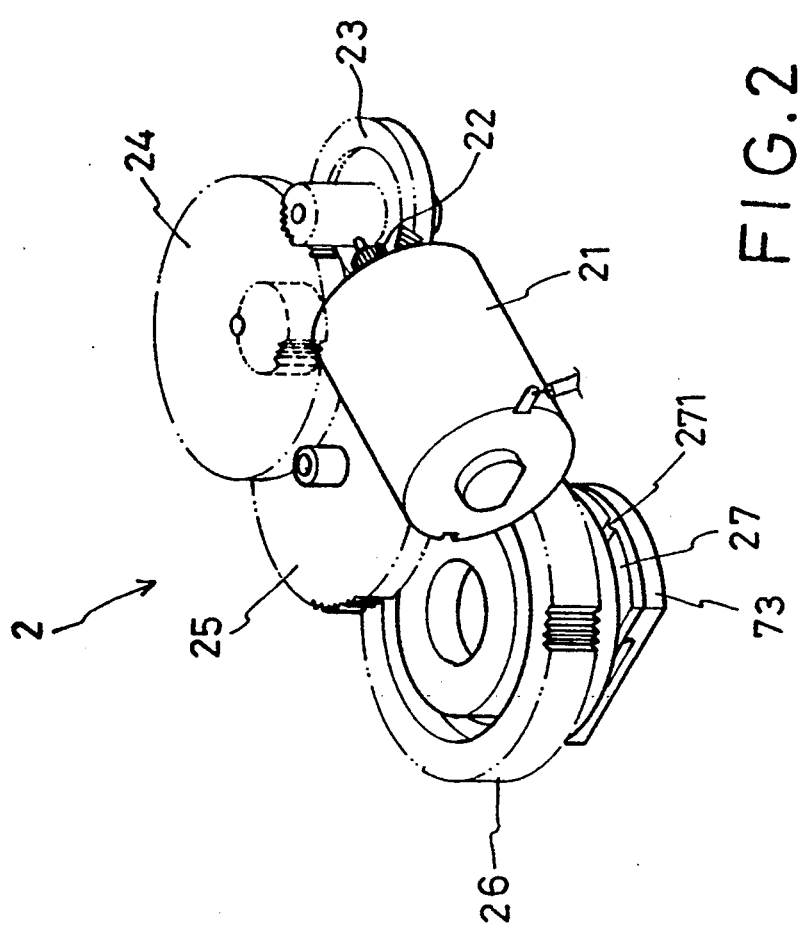

MULTIPURPOSE FOOD PROCESSOR

BACKGROUND OF THE INVENTION

The present invention relates to food processors, and relates more particularly to a multipurpose food processor which can be conveniently operated by one hand to cut or grate vegetables, fruits, etc.

Various food processors are well known and intensively used by housekeepers and cookers for processing fruits, vegetables, spices, etc. For example, the food processors of commercial names "PRESTO" and "MAXIM" are provided for cutting or shredding fruits and vegetables. However, these food processors must be operated by both hands. During the operation, one hand must press on the switch while the other hand presses the pressure plate to force the vegetables or fruits against the cutting tool. Another common drawback of these food processors is that the elongated feed hole complicates the maintenance work of the food processors. Furthermore, because the diameter of the elongated feed hole is small, fruits and vegetables must be cut into small pieces so that they can be put into the work bowl for processing.

There is also known a commercially available grinding apparatus of trade name "KRUPS" specifically designed for grating cheese or chocolates. However, this apparatus is still has drawbacks. One drawback of this apparatus is its limited processing capacity and small feeding hole. Another drawback of this apparatus is that it is not convenient for operation by one hand. Still another drawback of this apparatus is that the hand which presses on the pressure plate will soon become tired. Still another drawback of this apparatus is that the user's hand may be jammed in the pressure plate easily during the operation. Furthermore, this apparatus can only be used for grating cheese, chocolates, etc., but cannot be used for cutting or shredding fruits and vegetables.

SUMMARY OF THE INVENTION

The present invention has been accomplished under the circumstances in view. According to the present invention, the food processor comprises a power unit, a transmission mechanism mounted inside the power unit and connected to the power unit by a press button, an arched swivel arm pivotably connected to the power unit and controlled to release the press button for operation, a hollow shell coupled to the bottom cover of the power unit and defining with a movable pressure plate a work chamber, a rotary cylinder suspended inside the hollow shell and rotated by the transmission mechanism to move cutting tools through vegetables, fruits,. etc., in the work chamber when the pressure plate is moved toward the rotary cylinder. The present invention achieves various advantages as outlined hereinafter.

1) The food processor can be operated by one hand. When the thumb is pressed on the press button to turn on the power unit, the other four fingers can be pressed on the pressure plate to force the things to be processed toward the rotary cylinder. When the food processor is operated with one hand, the processed pieces, shreds, etc., directly fall out of the rotary drum through the bottom outlet thereof, and the user has the other hand free for doing other things such as holding a dish, operating a ladle, etc.
2) Fruits and vegetables can be directly put into the work chamber for processing, and the pressure plate can be moved relative to the hollow shell to adjust the size of the work chamber according to the amount of the fruits or vegetables to be processed.
3) Different rotary cylinders which carry different tools such as cutter blades, mandolins, graters, etc. can be used alternatively for different purposes.
4) The housing and the rotary drum can be separated from the power unit for wash with water conveniently.
5) Because the food processor uses battery power supply to drive the transmission mechanism, it can be used indoors as well as outdoors.
6) When the arched swivel arm is inserted into the curved bottom slot on the power unit, it locks the press, and therefore the food processor will not be triggered when a child touches the press button.

BRIEF DESCRIPTION OF THE DRAWINGS

FIG. 2 is an elevational view of the transmission mechanism for the food processor shown in FIG. 1;

DETAILED DESCRIPTION OF THE PREFERRED EMBODIMENT

Figure 1:
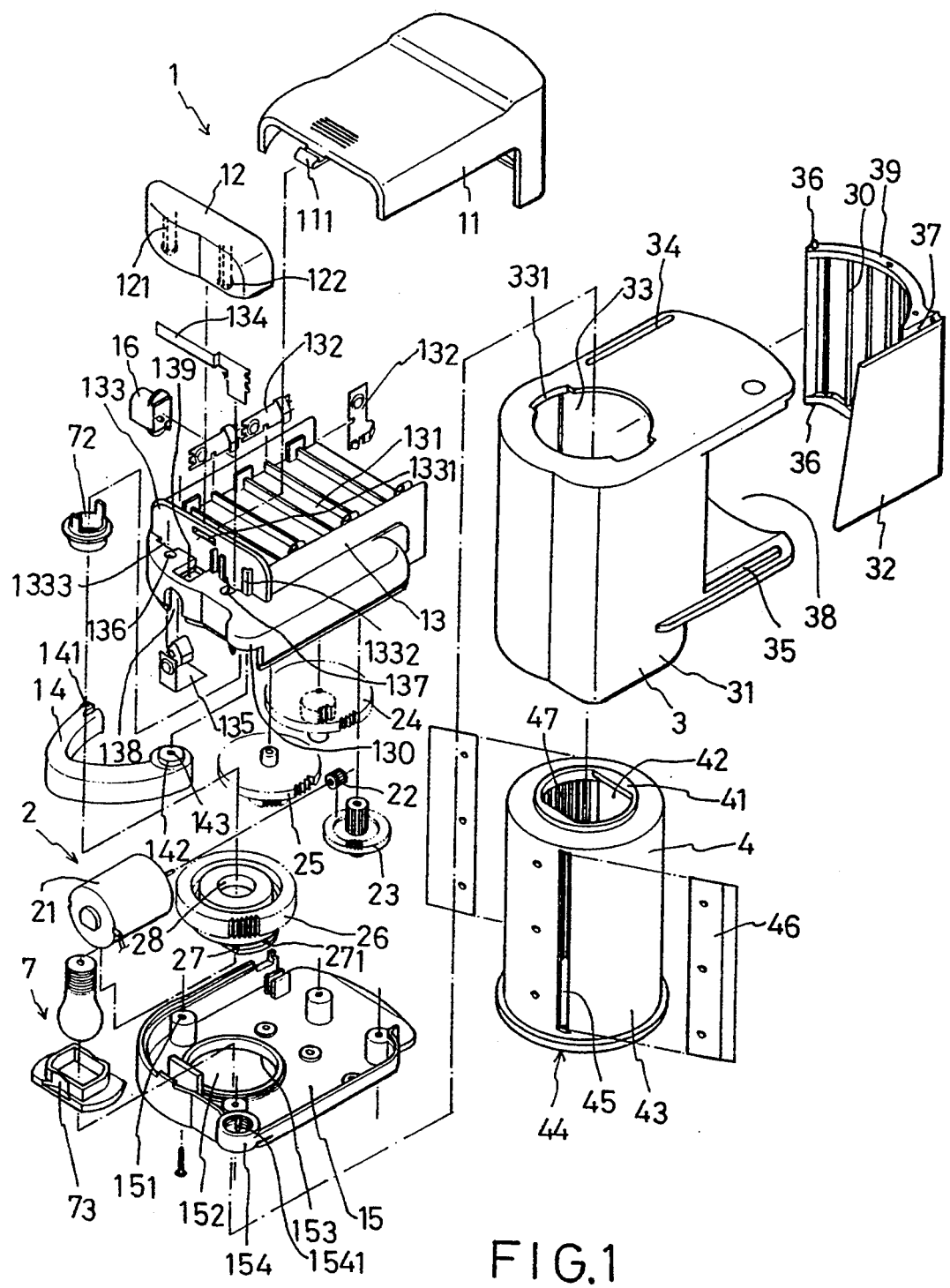
FIG. 1 is an exploded view of a food processor according to the present invention.

Referring to FIGS. 1 through 5, a food processor in accordance with the present invention is generally comprised of a power unit 1, a transmission mechanism 2, a housing 3, and a rotary drum 4.

The power unit 1 is comprised of a top cover 1, a press button 12, a battery holder 13, an arched swivel arm 14, and a bottom cover 15. The top cover is made of L-shape covered over the top and back sides of the battery holder 13, having a front hook 111 for fastening to the battery holder 13. The press button 12 has two downward mounting rods 121 respectively terminating in an expanded head 122 for fastening to the battery holder 13, and a protruding press portion 123 spaced between the downward mounting rods 121 for operation to push a spring plate 134, which will be described further. The battery holder 13 comprises a top battery chamber 131 mounted with a plurality of contact metal plates 132 for receiving battery cells, a DC connector 16, an upright front board 133 disposed at the front side of the top battery chamber 131, which upright front board 133 having an elongated retaining hole 1331, which receives the front hook 111 of the top cover 11, a plurality of projecting strips 1332 and a locating hole 1333 bilaterally disposed in front of the upright front board 133, a metal spring plate 134 fastened to the projecting strips 1332, a L-shaped metal plate 135 fastened to the locating hole 1333 and spaced from the metal spring plate 134, a circular mounting hole 136 and an oblong mounting hole 137 disposed in front of the upright front board 133 for mounting the downward mounting rods 121 of the press button 12, a curved bottom slot 138 below the top battery chamber 131 for mounting the arched swivel arm 14, a spring hook 139 releasably hooked on the protruding press portion 123 of the press button 12 at the bottom, an axle housing 130 in one front corner, and a pin 1301 at the center of the axle housing 130 for mounting the arched swivel arm 14. The arched swivel arm 14 has a stop edge 141 at one end moved in the curved bottom slot 130, two opposite stub rods 142 vertically disposed at an opposite end and retained between the battery holder 13 and the bottom cover 15, a pin hole 143 through the stub rods 142 for mounting the pin 1301 on the axle housing 130 of the battery holder 13 and the pin 1541 of the axle housing 154 on the bottom cover 15. The bottom cover 15 fits over the battery holder 13, comprising a plurality of screw holes 151 connected to respective screw holes (not shown) on the bottom side of the battery holder 13 by screws, an opening 152 near the front end, through which the transmission mechanism 2 passes, two L-shaped flanges 153 raised from the periphery of the opening 152 at two opposite locations for connection to the housing 3 through a rotary motion, an axle housing 154 in one front corner for holding one stub rod 142 of the arched swivel arm 14, a pin 1541 at the center of the axle housing 154 for insertion into the pin hole 143 on the stub rods 142 of the arched swivel arm 14.

The transmission mechanism 2 is disposed between the battery holder 13 and the bottom cover 15, comprised of a motor 21, a pinion 22 fixedly mounted around the output shaft of the motor 21, a first reducing gear 23 meshed with the pinion 22, a second reducing gear 24 meshed with the first reducing gear 23, a third reducing gear 25 meshed with the second reducing gear 24, a transmission gear 26 meshed with the third reducing gear 25, and a hollow coupling block 27 securely fixed to the transmission gear 26 and having ribs 271 for coupling to the rotary drum 4. The motor 21 is driven by battery power supply from the battery holder 12 to turn the pinion 22, causing the pinion 22 to turn the transmission gear 26 through the reducing gears 23, 24, and 25, and therefore the rotary drum 4 is rotated by the transmission gear 26 to process foods.

The housing 3 is comprised of a hollow shell 31, and a pressure plate 32 coupled to the hollow shell 31. The hollow shell 31 defines with the pressure plate 32 a work chamber 38, having a top opening 33 aligned with the opening 152 on the bottom cover 15, two retaining notches 331 on the periphery of the top opening 33 at two opposite locations, which are respectively fastened to the L-shaped flanges 153 on the bottom cover 15 by turning the hollow shell 31 through 90° angle relative to the bottom cover 15 after the insertion of the L-shaped flanges 153 into the retaining notches 331, two vertically spaced horizontal sliding slots 34 and two vertically spaced horizontal tracks 35 bilaterally disposed in parallel for the sliding of the pressure plate 32. The pressure plate 32 comprises an arched body 39, a plurality of vertical ribs 30 raised from the inside wall of the arched body 39, two round pins 36 raised from arched body 39 near one lateral side in reversed directions and respectively movably inserted into the horizontal sliding slots 34, and a vertical sliding board 32 extended from an opposite lateral side and moved between the tracks 35. When the pressure plate 32 is moved outwards from the hollow shell 31, the vertical sliding board 32 is disconnected from the tracks 35, and the round pins 36 are stopped at the outer ends of the horizontal sliding slots 34, and therefore the pressure plate 32 can be turned on the axis through the round pins 36 to open the work chamber 38 for allowing the food to be inserted into the work chamber 38 for processing. When the pressure plate 32 is turned inwards in the reversed direction to force the sliding board 37 into engagement with the tracks 35, the pressure plate 32 is pushed toward the hollow shell 31 to close the work chamber 38.

The rotary drum 4 comprises a drum body 43, a top flange 41 raised from the top side of the drum body 43 and defining a coupling hole 42 for connection to the hollow coupling block 27 of the transmission mechanism 2, a bottom outlet 44 at the bottom side of the drum body 43, a plurality of longitudinal slots 45 through the periphery of the drum body 43, a plurality of cutter blades 46 respectively fastened to the longitudinal slots 45 and disposed tangent to the periphery of the drum body 43.

Figure 4:
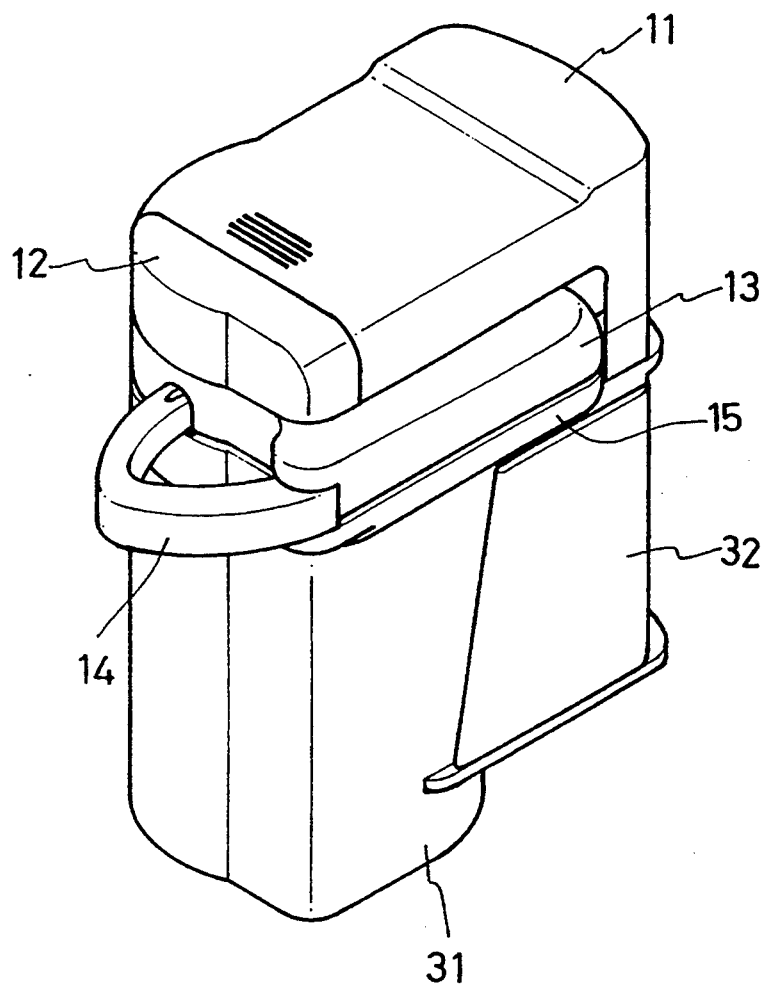
FIG. 4 is an elevational view of the food processor shown in FIG. 1.

The assembly process of the food processor is easy and outlined hereinafter. The bottom cover 15 is fastened to the battery holder 13 to hold the transmission mechanism 2 therebetween. After the top battery chamber 131 is loaded with the battery, the top cover 11 is closed on the battery holder 13 by fastening the front hook 111 into the retaining hole 1331, then the hollow shell 31 of the housing 3 is fastened to the bottom cover 15 by inserting the L-shaped flanges 153 into the retaining notches 331 and then turning hollow shell 31 through 90° angle relative to the bottom cover 15. FIG. 4 shows the food processor assembled.

Figure 3A:
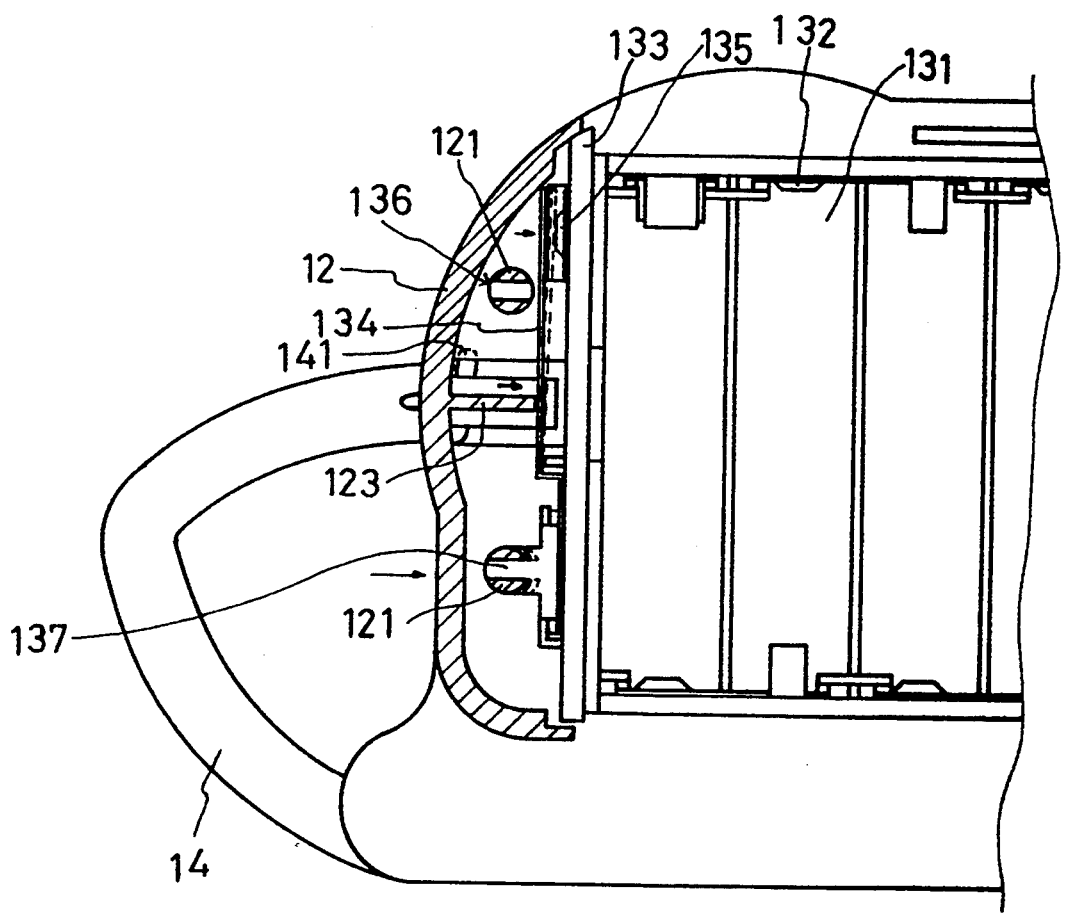
FIG. 3A is a top view in section of the front part of the power unit for the food processor shown in FIG. 1.
Figure 3B:
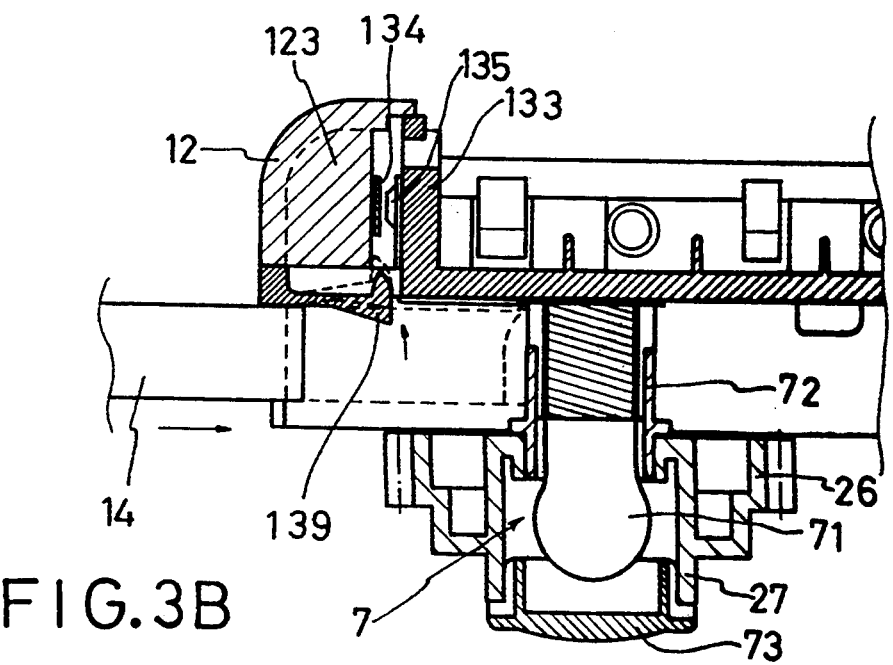
FIG. 3B is a side view in section of the front part of the power unit and the transmission mechanism for the food processor shown in FIG. 1.
Figure 5:
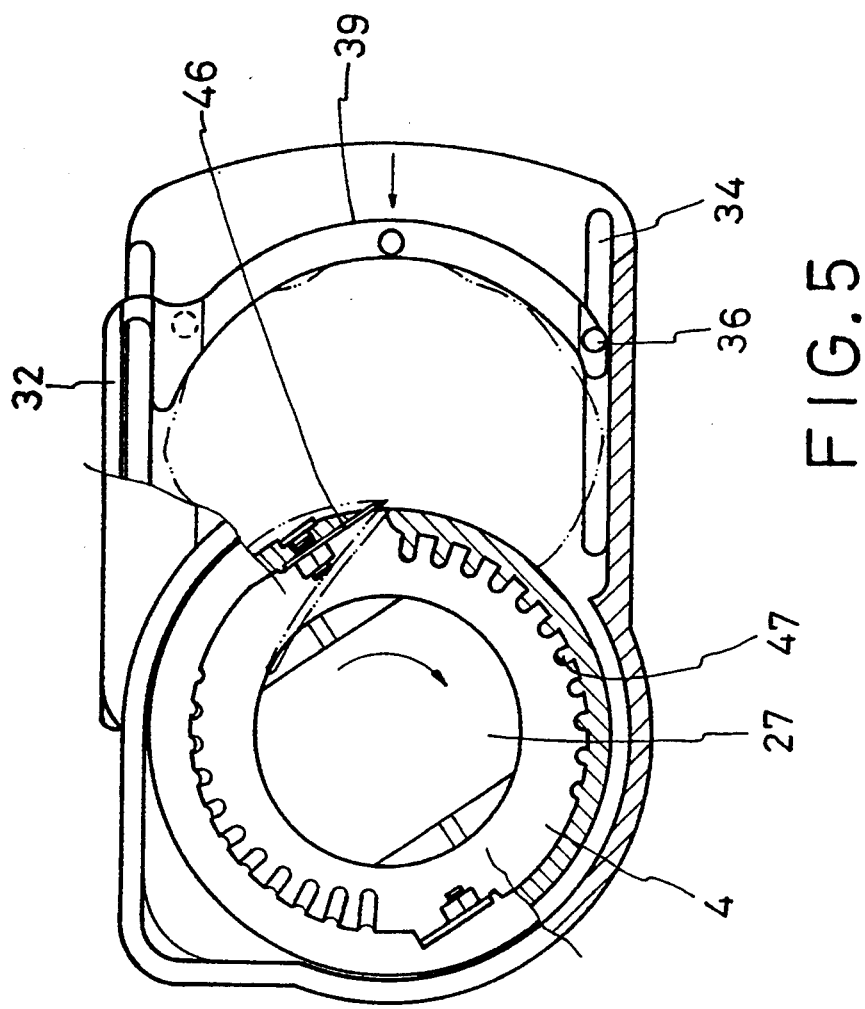
FIG. 5 is a top view in plain of the food processor shown in FIG. 4, showing the rotary drum rotated and the pressure plate moved toward the first rotary drum.

Referring to FIGS. 3A, 3B, and 5, before the operation of the food processor, the arched swivel arm 14 is turned outwards, permitting the stop edge 141 to be stopped at the outer end of the bottom slot 138 on the inside. When the stop edge 141 is stopped at the outer end of the bottom slot 138, the spring hook 139 is released from the protruding press portion 123, allowing the press button 12 to be pressed. When the press button 12 is pressed, it is turned on the longitudinal axis of the downward mounting rod 121 in the circular mounting hole 136, and the other downward mounting rod 121 of the press button 12 is moved in the oblong mounting hole 137. Therefore, when the press button 12 is pressed, the protruding press portion 123 is moved to push the metal spring plate 134 forwards, causing the metal spring plate 134 to contact the L-shaped metal plate 135. The metal spring plate 134 touches the L-shaped metal plate 135, the battery power supply circuit of the food processor is closed to turn on the transmission mechanism 2, causing the rotary drum 4 rotated by the hollow coupling block 27 of the transmission gear 26. At the same time, the user forces arched body 39 of the pressure plate 32 forwards to press the fruits, vegetables, etc. against the periphery of the drum body 43 of the rotary drum 4, causing the fruits, vegetables, etc. cut into pieces by the cutter blades 46. The processed pieces will be guided out of the rotary drum 4 through the bottom outlet 44.

Figure 6:
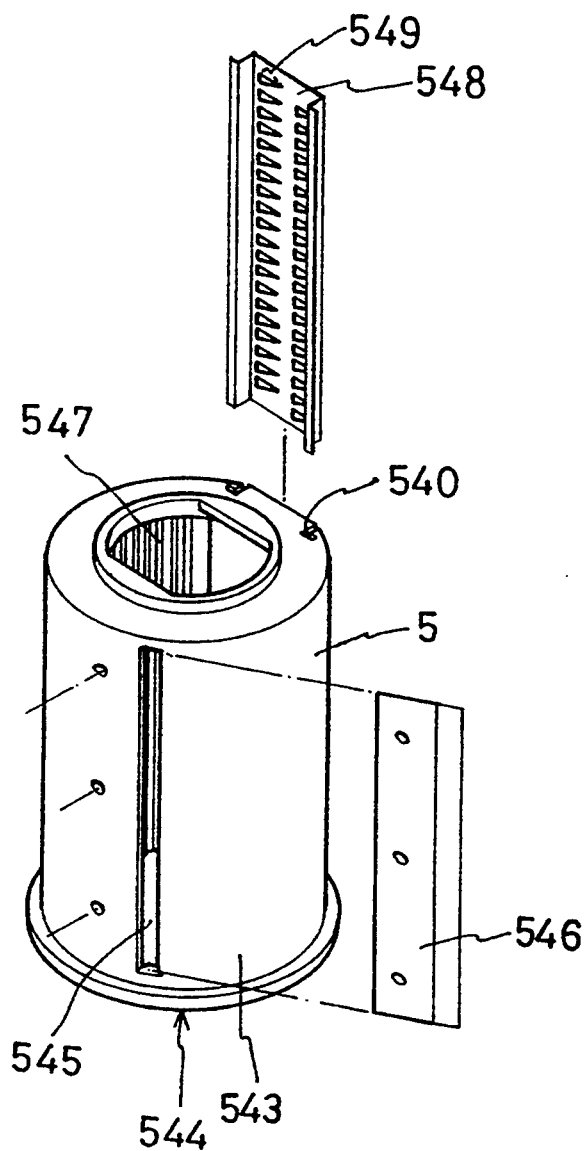
FIG. 6 is an exploded view of an alternate form of the rotary drum according to the present invention.

Referring to FIG. 6, a second rotary drum, referenced by 5, may be used and installed on the inside of the hollow shell 31 of housing 3 to replace the aforesaid first rotary drum 4. The size of the second rotary drum 5 is equal to that of the first rotary drum 4, having a bottom outlet 544, a longitudinal slot 545 through the periphery of the drum body 543 thereof to hold a cutter blade 546, two parallel tool mounting grooves 540 longitudinally disposed on outside wall of the drum body 543 opposite to the longitudinal slot 545 to hold a mandolin 548, which has rows of triangular cutting slots 549 for shredding. When the food processor is operated, the mandolin 548 cuts the vegetables or fruits into shreds, and the cutter blade 546 immediately cuts off the shreds from the vegetables or fruits. Furthermore, a plurality of longitudinal ribs 47 or 547 are raised from the inside wall of the drum body 43 or 543. The arrangement of the longitudinal ribs 47 or 547 prevents the processed wet pieces of fruits or vegetables from adhering to the inside wall of the drum body 43 or 543. When the processed we pieces of fruits or vegetables touch the longitudinal ribs 47 or 547, they will be immediately be guided to the bottom outlet 44 or 544 of the drum body 43 or 543 by the longitudinal ribs 47 or 547.

Figure 7:
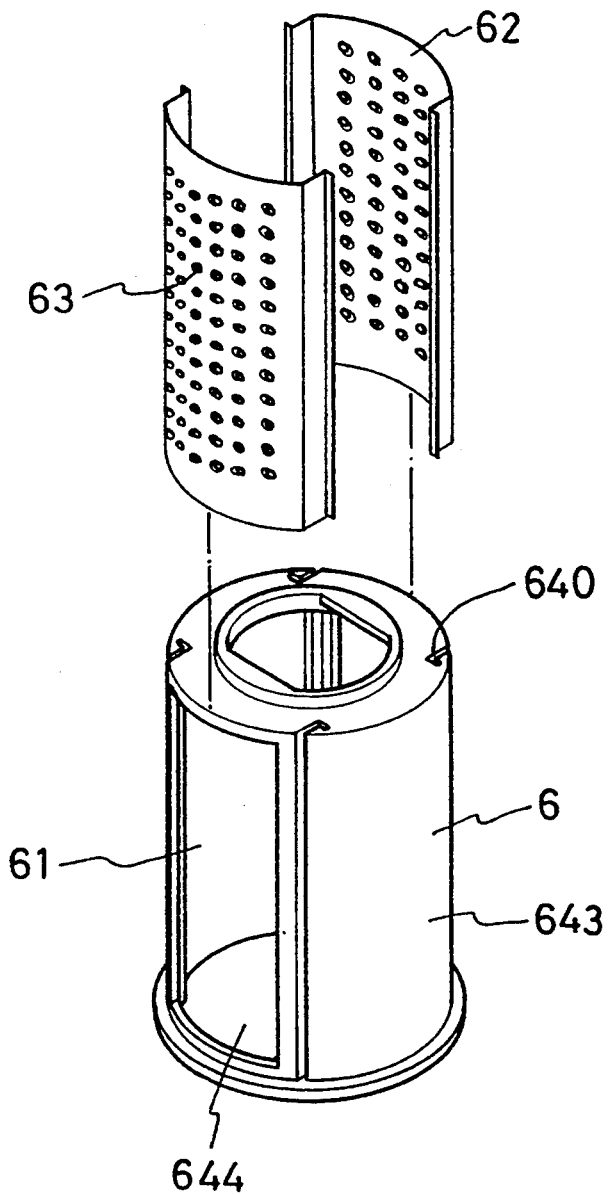
FIG. 7 is an exploded view of another alternate form of the rotary drum according to the present invention.

Referring to FIG. 7, a third rotary drum, referenced by 6, may be used and installed on the inside of the hollow shell 31 of housing 3 to replace the aforesaid first or second rotary drum 4 or 5. The size of the third rotary drum 6 is equal to that of the first rotary drum 4, having a bottom outlet 644, two opposite pairs of parallel tool mounting grooves 640 longitudinally disposed on the outside wall of the drum body 643, two opposite openings 61 through the periphery of the drum body 641 between each pair of parallel tool mounting grooves 640, and two graters 62 respectively fastened to the parallel tool mounting grooves 640 and suspended over the openings 61, each grater 62 having rows of protruding holes 63. When the food processor is operated, the rotary drum 6 is turned to move the graters 62 over the spices, vegetables, etc., causing the spices, vegetables, etc. ground to powder. The powder thus obtained is then guided out of the bottom outlet 644 of the rotary drum 6 for ready use.

Referring to FIGS. 1 and 3B again, the transmission gear 26 has a center through hole 28 through the hollow coupling block 27 to hold a lighting device 7. The lighting device 7 comprises a lamp bulb 71, a lamp holder 72, and a transparent lamp shade 73 fastened to hollow coupling block 27. The two opposite contact ends of the lamp bulb 71 are respectively connected to the metal spring plate 134 and the L-shaped metal plate 135, therefore the lighting device 7 is simultaneously turned when the press button 12 is pressed on. On the contrary, when the food processor does no work, the lighting device 7 is simultaneously turned off. The lamp holder 72 is securely fixed to the bottom side of the battery holder 13 to hold the lamp bulb 71 in the center through hole 28 of the transmission gear 26, therefore the lamp holder 72 will not be rotated by the transmission gear 26 during the operation of the transmission mechanism 2. The lamp shade 73 has a convex bottom side which brings light together into a beam projecting onto the center of the bottom side of the rotary drum 4, 5, or 6.

While only one embodiment of the present invention has been shown and described, it will be understood that various modifications and changes could be made without departing from the spirit and scope of the invention.

What is claimed is:
1. A food processor comprising:
 a power unit comprised of a battery holder having a top side covered by a top cover and a bottom side covered by a bottom cover, a press button mounted on said battery holder, and an arched swivel arm pivotably connected to said battery holder, said battery holder comprising a top battery chamber, a battery power supply mounted inside said top battery chamber, a metal contact plate connected to one end of said battery power supply, a metal spring plate connected to an opposite end of said battery power supply and depressed by said press button to contact said metal contact plate, a circular press button mounting hole and an oblong press button mounting hole for mounting said press button, a curved bottom slot, a spring hook releasably hooked on said press button, and an axle housing in one front corner thereof, said press button comprising a first downward mounting rod and a second downward mounting rod respectively fastened to said circular press button mounting hole and said oblong press button mounting hole, and a protruding press portion disposed between said first and second downward mounting rods, said arched swivel arm having a fixed end pivotably connected to the axle housing of said battery holder by a pivot pin and a free end movably inserted into said curved bottom slot on said battery holder, said bottom cover comprising an opening, two L-shaped flanges raised from the periphery of the opening on said bottom cover at two opposite locations, said spring hook being hooked on said press button to stop said press button from being moved forwards when the free end of said arched swivel arm is inserted into said curved bottom slot, said spring hook being released from said press button for allowing said press button to be pressed to force said metal spring plate into contact with said contact metal plate when the free end of said arched swivel arm is pulled outwards from said curved bottom slot,
 a transmission mechanism mounted inside said power unit and disposed between said battery holder and said bottom cover and electrically connected to said battery power supply through said metal spring plate and said metal contact plate of said battery holder, said transmission mechanism comprised of a motor having an output shaft, a pinion fixedly mounted around said output shaft, a transmission gear, a series of reducing gears meshed between said pinion and said transmission gear, said transmission gear having a hollow bottom coupling block extended out of the opening on said bottom cover;
 a housing comprised of a hollow shell and a pressure plate and coupled to said bottom cover of said power unit, said hollow shell and said pressure plate defining a work chamber for holding the object to be processed, said hollow shell comprising a top opening connected to the opening on said bottom cover, two vertically spaced horizontal sliding slots and two vertically spaced horizontal tracks bilaterally disposed in parallel for the sliding of said pressure plate, said pressure plate having two round pins vertically aligned at one lateral side thereof and respectively movably inserted into said horizontal sliding slots and a vertical sliding board extended from an opposite lateral side thereof and moved between said tracks; and
 a rotary drum installed on the inside of said hollow shell and turned by said transmission mechanism to process vegetables, fruits, etc., said rotary drum comprising a drum body, a top flange, a top cou- pling hole defined within said top flange and coupled to said hollow coupling block of said transmission gear, a bottom outlet, and a plurality of tools securely fastened to the periphery of said drum body and moved by said drum body to act against the object to be processed when said press button is depressed to turn on said transmission mechanism and said pressure plate is moved by hand toward said hollow shell to force the object to be process against said rotary drum.

2. The food processor of claim 1 wherein said downward mounting rods of said press button have a respective expanded end respectively retained inside said circular press button mounting hole and said oblong press button mounting hole.

3. The food processor of claim 1 wherein said press button is depressed, said first downward mounting rod is turned in said circular press button mounting hole and said second downward mounting rod is moved forwards along said oblong press button mounting hole, causing said protruding press portion to force said metal spring plate against said contact metal plate.

4. The food processor of claim 1 wherein the fixed end of said arched swivel arm has two opposite stub rods respectively turnably inserted into the axle housings of said battery holder and said bottom cover; the free end of said arched swivel arm has a stop edge, which limits the outward movement of the free end of said arched swivel arm in said curved bottom slot.

5. The food processor of claim 4 wherein the fixed end of said arched swivel arm has a through hole through said stub rods; the axle housings of said battery holder and said bottom cover has a center pin respectively inserted into the through hole on said stub rods.

6. The food processor of claim 1 wherein said transmission gear has a center through hole through said hollow coupling block to hold a lighting device, said lighting device comprising a lamp holder securely fixed to said battery holder, a lamp bulb held in the center through hole on said transmission gear by said lamp holder and electrically connected to said battery power supply through said metal spring plate and said contact metal plate, and a lamp shade covered on said.

7. The food processor of claim 6 wherein said said lamp shade is made from transparent material, having a convex bottom side for bringing light together into a beam.

8. The food processor of claim 1 wherein said rotary drum has two longitudinal slots and two cutter blades securely fixed to said longitudinal slots and disposed tangent to the periphery of said drum body.

9. The food processor of claim 1 wherein said rotary drum comprises a longitudinal slot and two parallel tool mounting grooves longitudinally disposed on the drum body at two opposite sides, a cutter blade securely fixed to the longitudinal slot and tangent to the periphery of the drum body, and a mandolin securely fixed to the parallel tool mounting grooves.

10. The food processor of claim 8 wherein the drum body of said rotary drum has a plurality of longitudinal ribs raised from the inside wall thereof.

11. The food processor of claim 9 wherein the drum body of said rotary drum has a plurality of longitudinal ribs raised from the inside wall thereof.

12. The food processor of claim 1 wherein said rotary drum comprises two opposite pairs of parallel tool mounting grooves longitudinally disposed on the drum body, two openings through the drum body between the parallel tool mounting grooves, and two graters respectively fixed to the parallel tool mounting grooves and suspended over the openings.

13. The food processor of claim 1 wherein said hollow shell of said housing comprises two retaining notches on the periphery of the top opening thereof at two opposite locations and respectively fastened to said L-shaped flanges of said bottom cover by turning said hollow shell relative to said bottom cover after the insertion of said L-shaped flanges of said bottom cover into said retaining notches.

14. The food processor of claim 1 wherein said hollow bottom coupling block of said transmission gear is fastened to the top opening on said rotary drum through a rotary joint.

15. The food processor of claim 14 wherein said hollow bottom coupling blocks has ribs, which stop inside the top opening of said rotary drum when said hollow bottom coupling block of said transmission gear is fastened to the top opening of said rotary drum.

16. The food processor of claim 1 wherein said pressure plate of said housing has a plurality of longitudinal ribs.

* * * * *